United States Patent
Lee et al.

(10) Patent No.: US 9,184,826 B2
(45) Date of Patent: Nov. 10, 2015

(54) METHOD FOR PROCESSING SIGNALS RECEIVED FROM A TRANSMISSION DEVICE IN A WIRELESS COMMUNICATION SYSTEM

(75) Inventors: Hyun Woo Lee, Anyang-si (KR); Han Gyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 13/578,504

(22) PCT Filed: Feb. 10, 2011

(86) PCT No.: PCT/KR2011/000887
§ 371 (c)(1),
(2), (4) Date: Aug. 10, 2012

(87) PCT Pub. No.: WO2011/099785
PCT Pub. Date: Aug. 18, 2011

(65) Prior Publication Data
US 2012/0327855 A1    Dec. 27, 2012

Related U.S. Application Data

(60) Provisional application No. 61/303,689, filed on Feb. 12, 2010, provisional application No. 61/369,040, filed on Jul. 29, 2010.

(30) Foreign Application Priority Data

Feb. 7, 2011    (KR) .................... 10-2011-0010641

(51) Int. Cl.
*H04W 4/00*    (2009.01)
*H04B 7/155*    (2006.01)
(Continued)

(52) U.S. Cl.
CPC .............. *H04B 7/155* (2013.01); *H04L 1/0072* (2013.01); *H04L 1/1812* (2013.01); *H04L 27/2602* (2013.01)

(58) Field of Classification Search
CPC ............ H04L 29/12207; H04L 1/0047; H04L 1/0027; H04W 28/10; H04W 4/00
USPC .................................................. 370/328–329
See application file for complete search history.

(56) References Cited

U.S. PATENT DOCUMENTS 8,363,593 B2 * 1/2013 Zhang et al. .................. 370/328
8,644,266 B2 * 2/2014 Baker et al. ................... 370/336
(Continued)

FOREIGN PATENT DOCUMENTS

KR    10-0165610 B1    2/1999
KR    10-2007-0118738 A    12/2007

*Primary Examiner* — Chandrahas Patel
*Assistant Examiner* — Lan Huong Truong
(74) *Attorney, Agent, or Firm* — Birch, Stewart, Kolasch & Birch, LLP

(57) ABSTRACT

The present invention provides a method for reducing consumption of resources due to blind decoding when UE (User Equipment) carries out control and data communication with reference to specific embodiments. For example, a communication method according to an embodiment of the present invention can reduce resource consumption of UE by reducing the number of blind decoding according to the information obtained by the UE. In other words, a communication method and apparatus according to one embodiment of the present invention reduces blind decoding of a control channel for control and data communication based on information obtained by UE.

6 Claims, 13 Drawing Sheets

(51) Int. Cl.
*H04L 1/00* (2006.01)
*H04L 27/26* (2006.01)
*H04L 1/18* (2006.01)

(56) References Cited

U.S. PATENT DOCUMENTS

| | | |
|---|---|---|
| 2002/0177474 A1 | 11/2002 | Oliveira |
| 2005/0163075 A1* | 7/2005 | Malladi et al. ............... 370/329 |
| 2006/0037059 A1 | 2/2006 | Jin |
| 2008/0049690 A1* | 2/2008 | Kuchibhotla et al. ......... 370/338 |
| 2009/0135766 A1* | 5/2009 | Vitebsky et al. .............. 370/329 |
| 2009/0207773 A1* | 8/2009 | Feng et al. .................... 370/312 |
| 2009/0307554 A1* | 12/2009 | Marinier et al. .............. 714/748 |
| 2010/0098011 A1* | 4/2010 | Pelletier et al. ............... 370/329 |
| 2010/0202371 A1* | 8/2010 | Josiam et al. ................. 370/329 |
| 2011/0038271 A1* | 2/2011 | Shin et al. ..................... 370/252 |
| 2011/0044259 A1* | 2/2011 | Nimbalker et al. ........... 370/329 |
| 2011/0085502 A1* | 4/2011 | Malladi ......................... 370/329 |

* cited by examiner

METHOD FOR PROCESSING SIGNALS RECEIVED FROM A TRANSMISSION DEVICE IN A WIRELESS COMMUNICATION SYSTEM

CROSS REFERENCE TO RELATED APPLICATIONS

This application is the National Phase of PCT/KR2011/00887 filed on Feb. 10, 20011, which claims priority under 35 U.S.C. 119(e) to U.S. Provisional Application No. 61/303,689 filed on Feb. 12,2010 and U.S. Provisional Application No. 31/369,040 filed on Jul, 29. 2010,and under 35 U.S.C. 119(a) to Patent Application No. 10-2011-0010641 filed in Republic of Korea on Feb. 7. 2011, all of which are hereby expressly incorporated by reference to the present application.

TECHNICAL FIELD

The present invention relates to a method for processing data signals in a wireless communication system. More specifically, the present invention relates to a method for decoding signals transmitted from a base station.

BACKGROUND ART

In general, a mobile station decodes a part of control channels to request and receive control signals and data signals. A channel to be decoded for control and data signals is usually determined according to communication specifications. For example, a mobile station compliant with IEEE (Institute of Electrical and Electronics Engineers) 802.16m specifications requests and receives control and data signals by decoding A-MAP (Advanced MAP). Also, a mobile station compliant with the 3GPP (3rd Generation Partnership Project) LTE (Long Term Evolution) specifications requests and receives control and data signals by decoding a PDCCH (Physical Downlink Control Channel).

DISCLOSURE

Technical Problem

In general, mobile stations should continuously decode a control channel in order to request and receive control and data signals. For example, a mobile station compliant with the IEEE 802.16m specifications, while continuously decoding information included in A-MAP, should check whether there exists information transmitted to the mobile station. The A-MAP includes unicast control information, namely, unicast service control information. To distinguish each individual mobile station, unicast information may be used to carry out masking based on identification information such as STID (Station Identifier) or generate CRC (Cyclic Redundancy Check) based on identification information. Since unicast information may be masked or transmitted in the form of CRC, a mobile station attempting to receive control and data signals is subject to perform blind decoding up to information including signals intended for another mobile station.

Most of communication specifications require that a mobile station should perform blind decoding of a bunch of data since a control channel for control and data signals continuously transmits data. For example, according to the IEEE 802.16m specifications, A-MAP is included in all of subframes. Therefore, a mobile station following the IEEE 802.16m specifications, unless it stays in a special state such as sleep or idle, should perform blind decoding of A-MAP included in the whole subframes.

Therefore, a mobile station according to the prior art should interpret a large amount of unnecessary information. What is more, blind decoding of unnecessary information inevitably consumes battery of a mobile station.

Technical Solution

This document discloses a method for reducing waste of resources consequent to blind decoding at the time of performing control and data communication by mobile stations with reference to specific embodiments. For example, a communication method according to one embodiment can reduce waste of resources in a mobile station by decreasing the number of blind decoding. In other words, a method and an apparatus for communication according to one embodiment of the present invention reduces blind decoding of a control channel intended for control and data communication.

The present invention provides one example of a method and an apparatus for processing signals received from a transmission device in a wireless communication system.

A method according to one aspect of the present invention comprises obtaining information related to connection to the transmission device or information related to a channel; obtaining information about a decoding period determined according to the obtained information; and decoding a control channel received from the transmission device through wireless resources according to the decoding period.

A method according to another aspect of the present invention comprises obtaining information for identifying the mobile station; obtaining information about a decoding period determined according to the obtained information; and decoding a control channel received from a base station through wireless resources according to the decoding period.

A mobile station according to one aspect of the present invention comprises a processor obtaining information related to connection to the transmission device or information related to a channel and obtaining information about a decoding period determined according to the obtained information; and a receiving device decoding a control channel received from the transmission device through wireless resources according to the decoding period.

Advantageous Effects

If a method and an apparatus for communication according to the present invention is employed, battery consumption can be reduced. Also, unnecessary decoding can be avoided. Furthermore, the present invention reduced unnecessary decoding, thereby improving efficiency of existing communication methods. Moreover, the present invention can support different latency by choosing various decoding timings and positions.

BEST MODE

Embodiments of the present invention described below provide a method and an apparatus for communication capable of transmitting and receiving data and control signals. Embodiments of the present invention may be used for various communication systems such as CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be realized by such radio technology as UTRA (Universal Terrestrial Radio Access) or CDMA2000. TDMA may be realized by such radio technology as GSM (Global System for Mobile communication), GPRS (General Packet Radio Service), or EDGE (Enhanced Data Rates for GSM Evolution). OFDMA may be realized by such radio technology as IEEE 802.11 (Wi-Fi), IEEE 802.16 (WiMAX), IEEE 802-20, or EUTRA (Evolved UTRA). The IEEE 802.16m is a version evolved from the IEEE 802.16e, providing backward compatibility with systems compliant with the IEEE 802.16e. UTRA belongs to UMTS (Universal Mobile Telecommunications System). The 3GPP (3rd Generation Partnership Project) LTE (Long Term Evolution) belongs to EUMTS (Evolved UMTS) using E-UTRA (Evolved-UMTS Terrestrial Radio Access), employing OFDMA for downlink transmission while SC-FDMA for uplink transmission. The LTE-A (Advanced) is an evolved version of the 3GPP LTE.

In what follows, for the purpose of clearly describing the present invention, embodiments will be described with reference to the IEEE 802.16m and the 3GPP LTE (Long Term Evolution). However, the technical scope defined by the appended claims is not limited to specific communication specifications.

In the following, the IEEE 802.16m will be described. The IEEE (Institute of Electrical and Electronics Engineers) 802.16e specification has been selected under the name of 'WMAN-OFDMA TDD' as the sixth specification of the IMT (International Mobile Telecommunication)-2000. ITU-R is developing the IMT-Advanced system as the next-generation 4G mobile communication specification after IMT-2000. The IEEE 802.16 WG (Working Group) decided to carry out the IEEE 802.16m project with a goal of developing amendment specifications of the existing IEEE 802.16e, to be completed by the end of 2006 as specifications for the IMT-Advanced system. As can be known from the goal above, the IEEE 802.16m specification involves two aspects: continuity from the past which is amendment of the IEEE 802.16e specification and continuity toward the future, as specification for the next-generation IMT-Advanced system. Therefore, the IEEE 802.16m specification requires that compatibility with mobile WiMAX systems based on the IEEE 802.16e specification should be maintained while at the same time, advanced requirements for the IMT-Advanced system should be satisfied.

Figure 1:
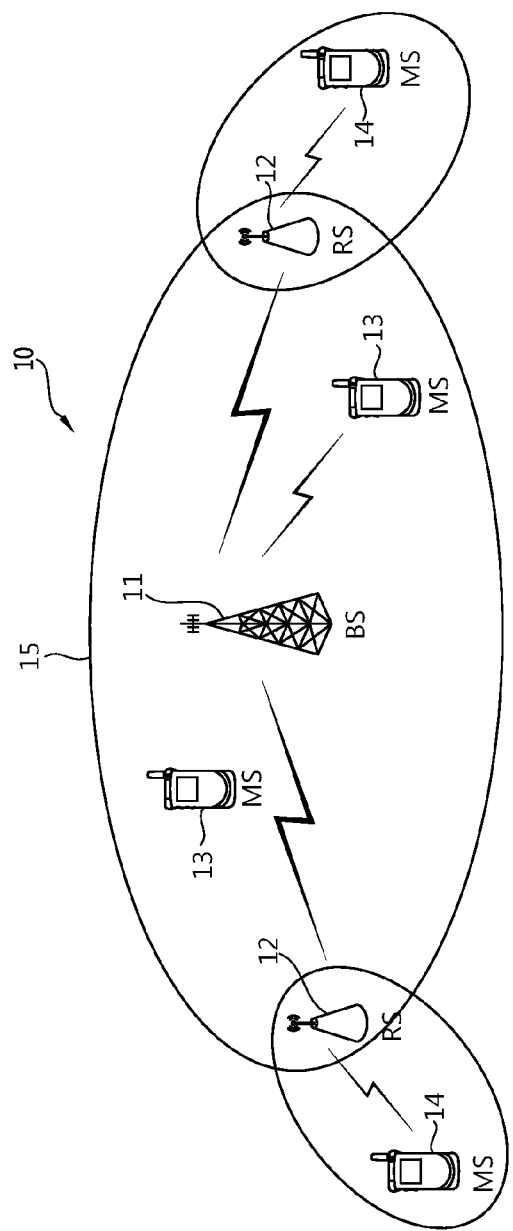
FIG. 1 illustrates a wireless communication system including a mobile station.

FIG. 1 illustrates a wireless communication system including a mobile station.

With reference to FIG. 1, a wireless communication system 10 including mobile stations includes at least one base station (BS) 11. Each base station 11 usually provides communication services for a particular geographic area 15, which is called a cell. A cell may be further divided into a plurality of areas, where each of the areas is called a sector. One base station may have one or more cells and one cell may have one or more base stations. A base station 11 usually refers to a fixed station communicating with mobile stations 13 and may alternatively called eNB (evolved NodeB), BTS (Base Transceiver System), Access Point, AN (Access Network), ABS (Advanced Base Station), or Node (Antenna Node). A base station 11 can include a relay station 12. In this case, a base station carries out functions such as connectivity, management, control and resource allocation between a relay station 12 and a mobile station 14.

A relay station (RS) 12 refers to a device relaying signals between a base station 11 and a mobile station 14, which may alternatively called RN (Relay Node), repeater, relay, or ARS (Advanced RS).

A mobile station (MS) 13, 14 may be fixed or mobile and can be alternatively called AMS (Advanced Mobile Station), UT (User Terminal), SS (Subscriber Station), wireless device, PDA (Personal Digital Assistant), wireless modem, handheld device, AT (Access Terminal), or UE (User Equipment). In the following, a macro mobile station refers to the one communicating directly with a base station 11 while a relay mobile station refers to the one communicating with a relay station. However, a macro mobile station 13 within a cell of a base station 11 may communicate with the base station 11 through a relay station 12 in order to enhance transmission speed due to a diversity effect.

Downlink transmission between a base station and a macro mobile station refers to the communication from the base station to the macro mobile station while uplink transmission the communication from the macro mobile station to the base station. Downlink transmission between a base station and a relay station indicates the communication from the base station to the relay station while uplink transmission the communication from the relay station to the base station. Downlink transmission between a relay station and a relay mobile station indicates the communication from the relay station to the relay mobile station while uplink transmission the communication from the relay mobile station to the relay station.

Figure 2:
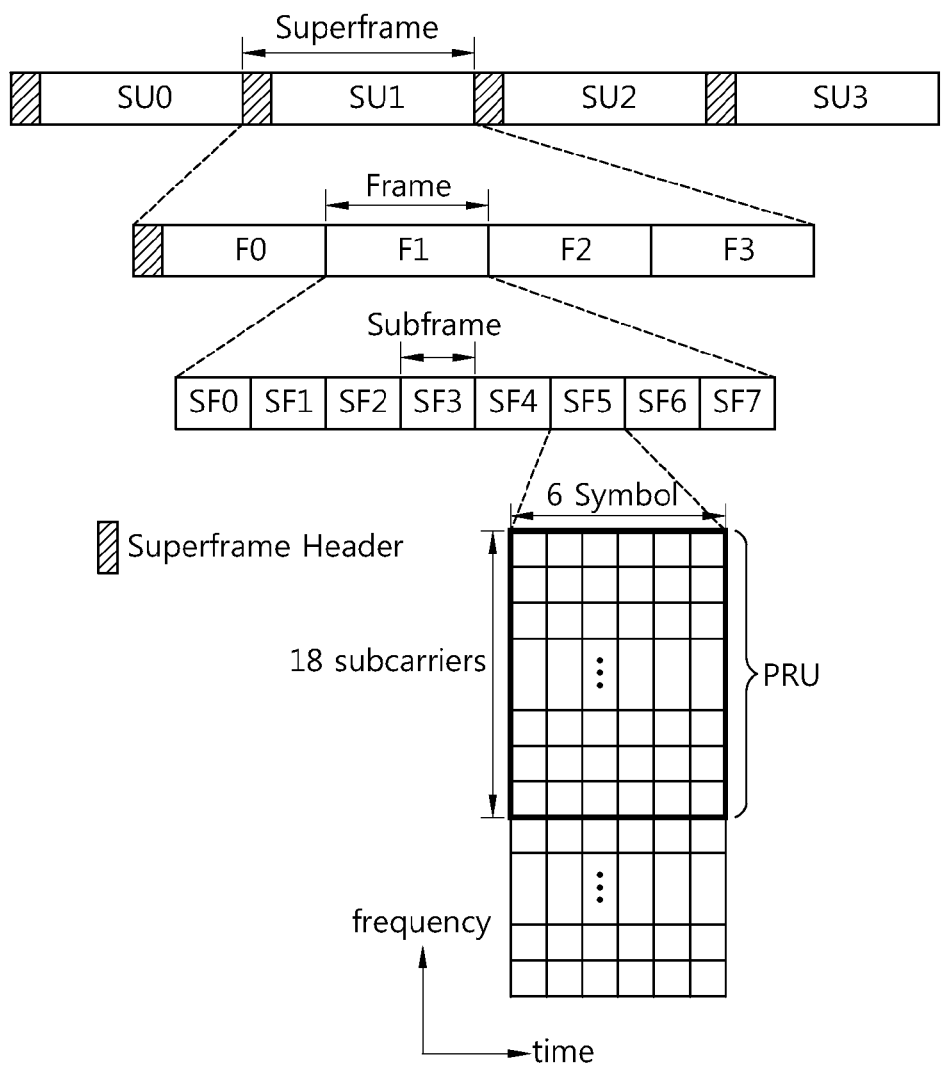
FIG. 2 is one example of frame structure.

FIG. 2 is one example of frame structure.

With reference to FIG. 2, a superframe (SF) comprises a superframe header (SFH) and four frames F0, F1, F2, F3. Length of each frame within a superframe may be the same to each other. Although it is assumed that size of each superframe is 20 ms and size of each frame is 5 ms, the present invention is not limited to the above assumption. Length of a superframe, the number of frames included in the superframe, the number of subframes included in the frame may be changed in various ways. The number of subframes included in a frame may vary according to channel bandwidth and length of CP (Cyclic Prefix).

A frame comprises a plurality of subframes SF0, SF1, SF2, SF3, SF4, SF5, SF6, SF7. Each subframe may be used for uplink or downlink transmission. A subframe includes a plurality of OFDM (Orthogonal Frequency Division Multiplexing) symbols or OFDMA (Orthogonal Frequency Division Multiple Access) in the time domain while a plurality of subcarriers in the frequency domain. OFDM symbol is intended for representing a single symbol period and can be alternatively called OFDMA symbol or SC-FDMA symbol depending on an employed method for multiple access. A subframe may comprise 5, 6, 7, or 9 OFDMA symbols; however, it is only an example and thus, the number of OFDMA symbols included in a subframe is not limited. The number of OFDMA symbols included in a subframe may be changed in various ways according to channel bandwidth and length of CP. Subframe type may be defined according to the number of OFDMA symbols included in a subframe.

For example, type-1 subframe may be defined to include 6 OFDMA symbols; type-2 subframe 7 OFDMA symbols; type-3 subframe 5 OFDMA symbols; and type-4 subframe 9 OFDMA symbols. A frame may include subframes, all of which are of the same type. Similarly, a frame may include subframe, all of which are different types from each other. In other words, The number of OFDMA symbols included in each subframe within a single frame may be the same to or different from each other. Likewise, the number of OFDMA symbols of at least one subframe within a single frame may be different from the number of OFDMA symbols of the remaining subframes within the frame.

TDD (Time Division Duplex) or FDD (Frequency Division Duplex) method can be applied to a frame. In the TDD method, each subframe is used for uplink or downlink transmission at different timing but at the same frequency. In other words, subframes within a frame employing the TDD method are divided into uplink subframes and downlink subframe in the time domain. A switching point refers to the timing point at which transmission direction is changed from an uplink area to a downlink area or vice versa; and the number of switching points within each frame in the TDD method may be two. In the FDD method, each subframe is used for uplink or downlink transmission at the same timing but at different frequencies. In other words, subframes within a frame employing the FDD method are divided into uplink subframes and downlink subframes in the frequency domain. Uplink and downlink transmission can be carried out simultaneously while occupying different frequency bands.

Figure 3:
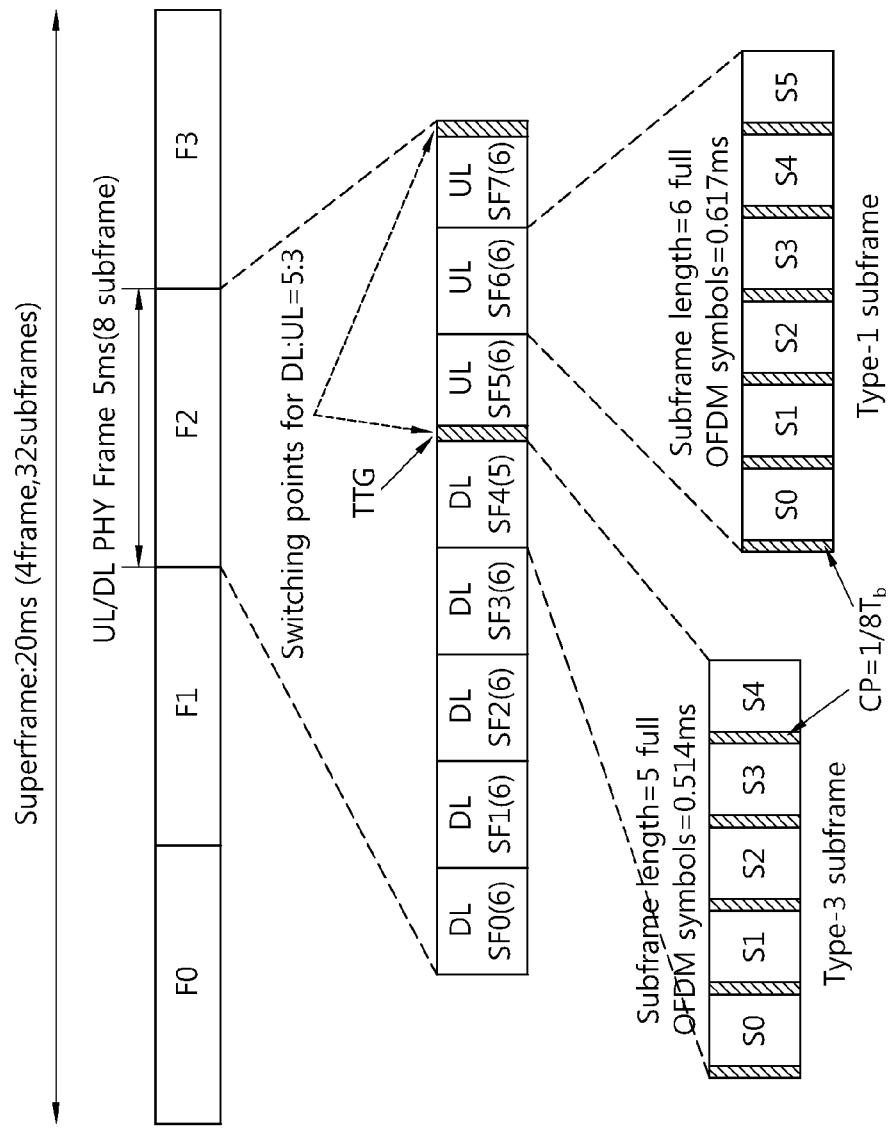
FIG. 3 is one example of TDD frame structure.

FIG. 3 is one example of TDD frame structure. The example corresponds to the case when G=⅛. A superframe with a length of 20 ms comprises four frames F0, F1, F2, F3. Each frame comprises 8 subframes SF0, SF1, SF2, SF3, SF4, SF5, SF6, SF7 and the ratio of a downlink subframe to an uplink subframe is 5:3. The structure of TDD frame in FIG. 3 can be applied to the case where bandwidth is 5 MHz, 10 MHz, or 20 MHz. The last downlink subframe SF4 comprises five OFDM symbols and the remaining subframes include six subframes. TTG illustrated in the figure refers to a transition gap between an uplink and downlink subframe.

Figure 4:
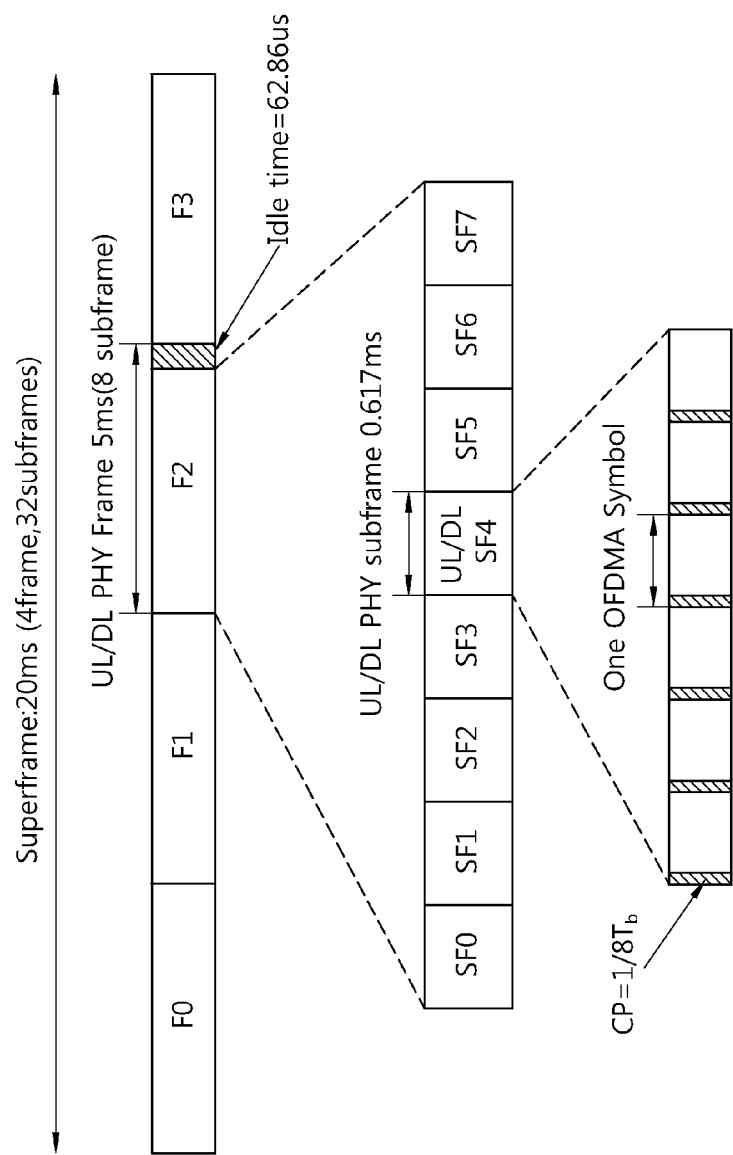
FIG. 4 is one example of FDD frame structure.

FIG. 4 is one example of FDD frame structure. The example corresponds to the case when G=⅛. A superframe with a length of 20 ms comprises four frames F0, F1, F2, F3. Each frame comprises 8 subframes SF0, SF1, SF2, SF3, SF4, SF5, SF6, SF7 and each subframe includes a downlink and an uplink area. The structure of FDD frame in FIG. 3 can be applied to the case where bandwidth is 5 MHz, 10 MHz, or 20 MHz.

Figure 5:
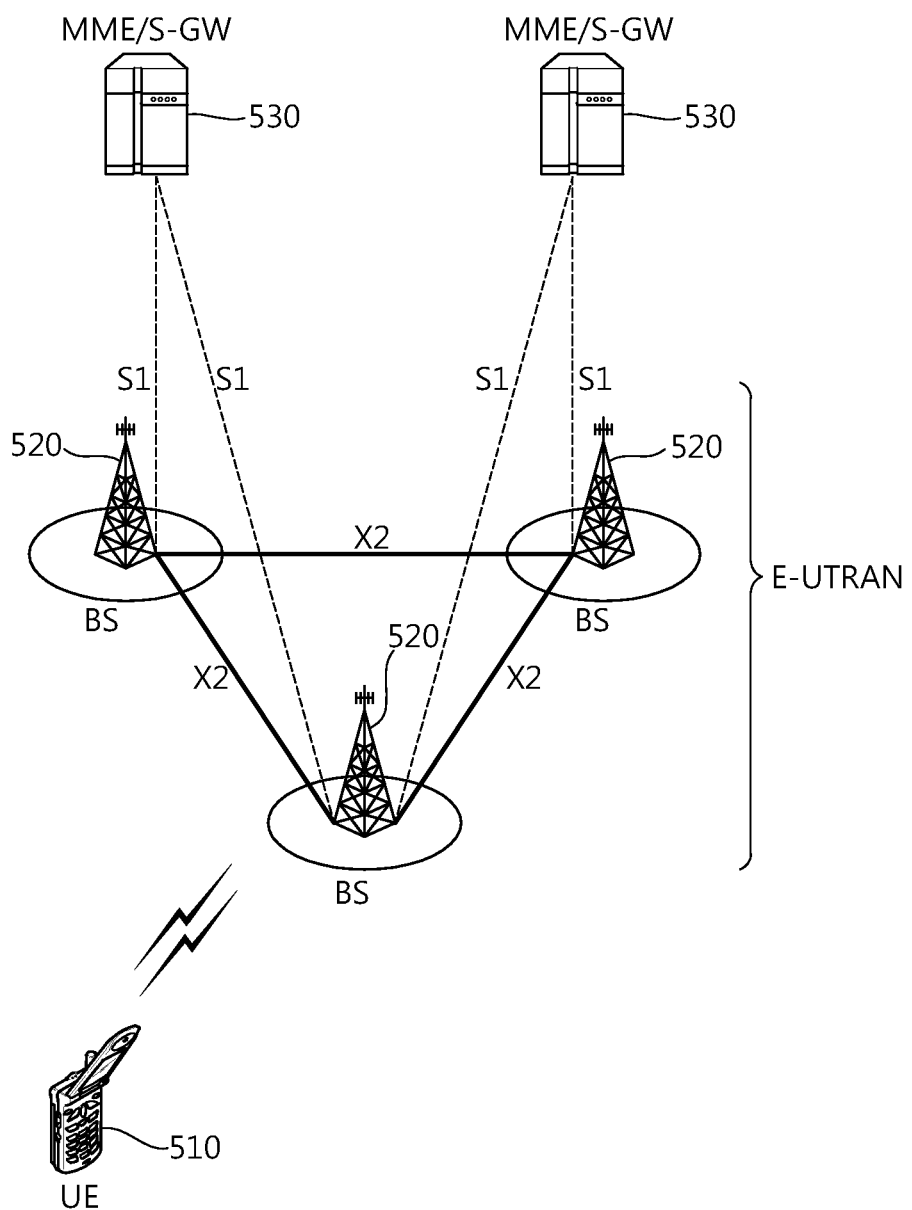
FIG. 5 is a block diagram illustrating a wireless communication system according to E-UMTS system.

In what follows, E-UMTS (Evolved-Universal Mobile Telecommunications System) or LTE system will be described. FIG. 5 is a block diagram illustrating a wireless communication system according to E-UMTS system. E-UMTS system may be regarded as an LTE (Long Term Evolution) system. A wireless communication system is widely deployed to provide various communication services such as voice and packet data service.

With reference to FIG. 5, E-UTRAN (Evolved-UMTS Terrestrial Radio Access Network) includes a base station 520 providing a control plane and a user plane.

A user equipment (UE) 510 may be fixed or mobile and alternatively called MS (Mobile Station), UT (User Terminal), SS (Subscriber Station), or wireless device. A base station 520 usually refers to a fixed station communicating with UE 510 and may be alternatively called eNB (evolve-NodeB), BTS (Base Transceiver System), or access point. A base station 520 may provide a service for at least one cell. A cell is the area for which the base station 520 provides a communication service. An interface for transmission of user traffic or control traffic may be employed between base stations 520. In what follows, downlink transmission refers to the transmission from a base station 520 to UE 510 while uplink transmission refers to the transmission from the UE 510 to the base station 520.

Base stations 520 may be connected to each other through X2 interface. A base station 520 is connected to EPC (Evolved Packet Core), more specifically MME (Mobility Management Entity)/S-GW (Serving Gateway) 530 through S1 interface. The S1 interface supports many-to-many relation between a base station 520 and MME/S-GW 530.

Layers of radio interface protocol between UE and a network can be divided into a first layer L1, a second layer L2 and a third layer L3 based on a lower three layers of well-known OSI (Open System Interconnection) model. The first layer is PHY (physical) layer. The second layer can be further divided into MAC (Medium Access Control) layer, RLC (Radio Link Control) layer and PDCP (Packet Data Convergence Protocol) layer. The third layer is RRC (Radio Resource Control) layer.

A wireless communication system may rely on OFDM (Orthogonal Frequency Division Multiplexing)/OFDMA (Orthogonal Frequency Division Multiple Access) or SC-FDMA (Single Carrier FDMA).

OFDM employs a plurality of orthogonal subcarriers. OFDM makes use of orthogonality between IFFT (Inverse Fast Fourier Transform) and FFT (Fast Fourier Transform). A receiver reconstructs the original data by applying FFT to received signals. A transmission device uses IFFT to combine multiple subcarriers and the receiver applies the corresponding FFT to separate the multiple subcarriers.

Figure 6:
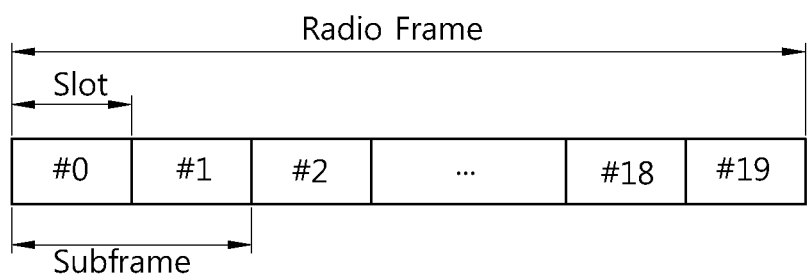
FIG. 6 illustrates a structure of a radio frame.

FIG. 6 illustrates a structure of a radio frame. With reference to FIG. 6, a radio frame comprises 10 subframes and one subframe may comprise two slots. Slots within a radio frame are numbered from 0 to 19. Time required to transmit a single subframe is called TTI (Transmission Time Interval). TTI may be regarded as a scheduling unit for data transmission. For example, length of a single radio frame may be 10 ms; length of a single subframe 1 ms; and length of a single slot 0.5 ms. The structure of the radio frame is only an example; the number of subframes included in a radio frame or the number of slots included in a subframe may be changed in various ways.

Figure 7:
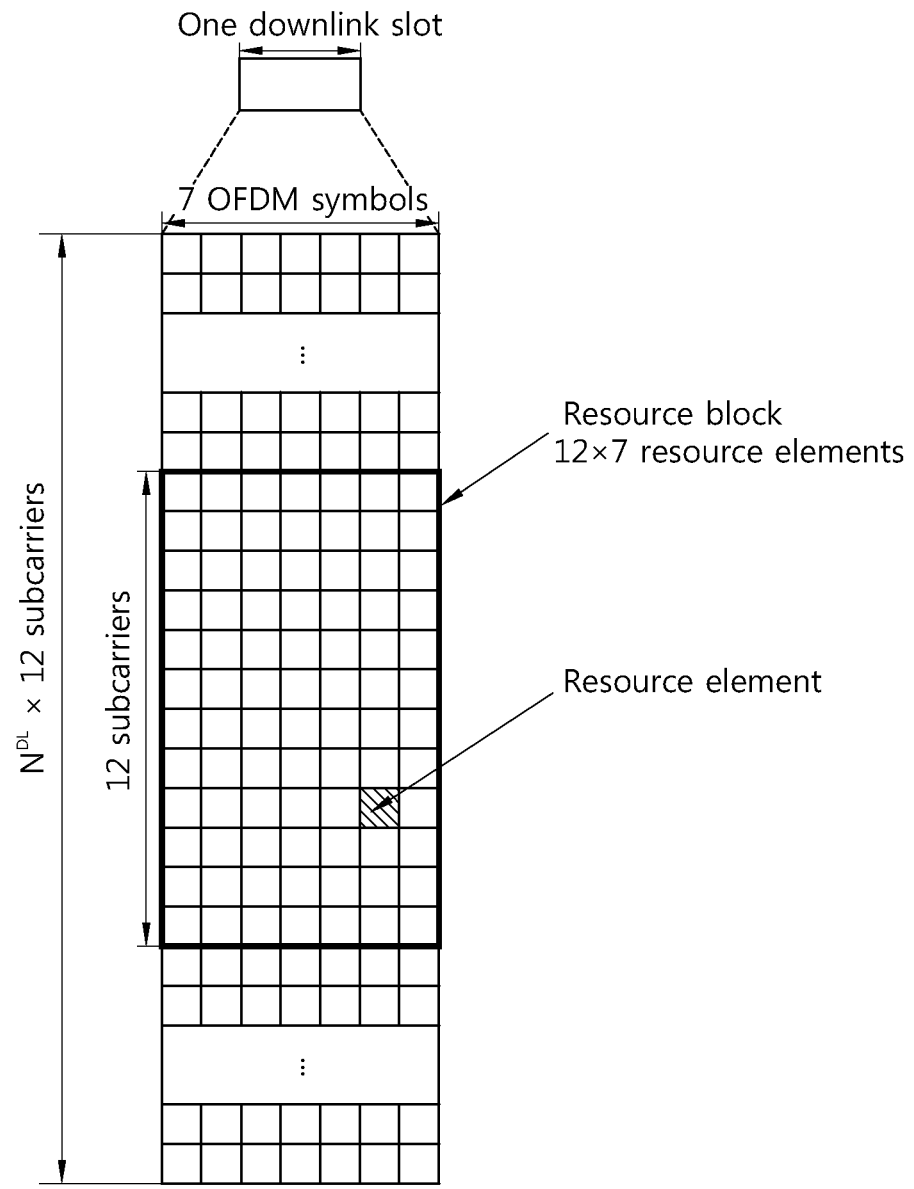
FIG. 7 illustrates a resource grid about one downlink slot.

FIG. 7 illustrates a resource grid about one downlink slot. With reference to FIG. 7, a downlink slot includes a plurality of OFDM symbols in the time domain and includes $N^{DL}$ resource blocks (RBs) in the frequency domain. The number of resource blocks $N^{DL}$ included in a downlink slot belongs to the downlink transmission bandwidth defined in a cell. For example, in the LTE system, $N^{DL}$ may correspond to one of numbers ranging from 60 to 110. A resource block includes a plurality of subcarriers in the frequency domain.

Each element of a resource grid is called a resource element. A resource element in a resource grid can be identified by an index pair (k, l) within a slot. Here, k (k=0, . . . , $N^{DL} \times 12-1$) stands for a subcarrier index of the frequency domain while l (l=0, . . . , 6) an OFDM symbol index of the time domain.

Although it was assumed that a resource block included 7 OFDM symbols in the time domain and 7×12 resource elements consisting of 12 subcarriers in the frequency domain, the number of OFDM symbols within a resource block and the number of subcarriers are not limited to the above example. The number of OFDM symbols and the number of subcarriers may be changed in various ways depending on the length of cyclic prefix (CP), frequency spacing, and the like. For example, in the case of a normal CP, the number of OFDM symbols is 7 while the number of OFDM symbols is 6 for the case of an extended CP. The number of subcarriers for a single OFDM symbol may assume one of 128, 256, 512, 1024, 1536, and 2048.

Figure 8:
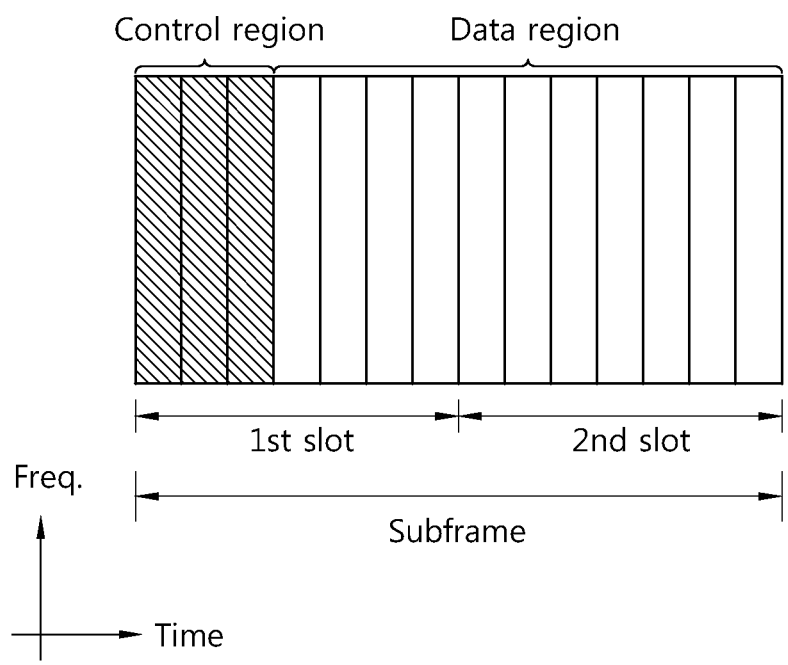
FIG. 8 illustrates a structure of a downlink subframe.

FIG. 8 illustrates a structure of a downlink subframe. With reference to FIG. 8, a downlink subframe includes two consecutive slots. Preceding three OFDM symbols of a first slot within a downlink subframe corresponds to a control region to which a PDCCH is allocated while the remaining OFDM symbols correspond to a data region to which a PDSCH is allocated. In the control region, control channels such as PCFICH, PHICH, and so on may be allocated in addition to the PDCCH. UE can read data information transmitted through a PDSCH by decoding control information transmitted through a PDCCH. Here, the assumption that a control region includes three OFDM symbols is only an example; a control region may include two or one OFDM symbol. The number of OFDM symbols included in the control region within a subframe can be known through PCFICH.

Control information transmitted through PDCCH is called downlink control information (hereinafter, it is called DCI). DCI includes uplink scheduling information, downlink scheduling information, system information, uplink power control command, control information for paging, control information for requesting a random access response, and the like.

DCI format includes a format for scheduling PUSCH (Physical Uplink Shared Channel) 0, a format for scheduling PDSCH (Physical Downlink Shared Chanel) 1, a format for compact scheduling of a single PDSCH codeword 1A, a format for compact scheduling about rank-1 transmission of a single codeword in a spatial multiplex mode 1B, a format for highly compact scheduling of DL-SCH (Downlink Shared Channel) 1C, a format for PDSCH scheduling in a multi-user multiplex mode 1D, a format for PDSCH scheduling in a closed-loop spatial multiplex mode 2, a format for PDSCH scheduling in an open-loop spatial multiplex mode 2A, a format for transmission of 2 bit TPC (Transmission Power Control) command for PUCCH and PUSCH 3, and a format for transmission of 1 bit TPC command for PUCCH and PUSCH 3A.

Figure 9:
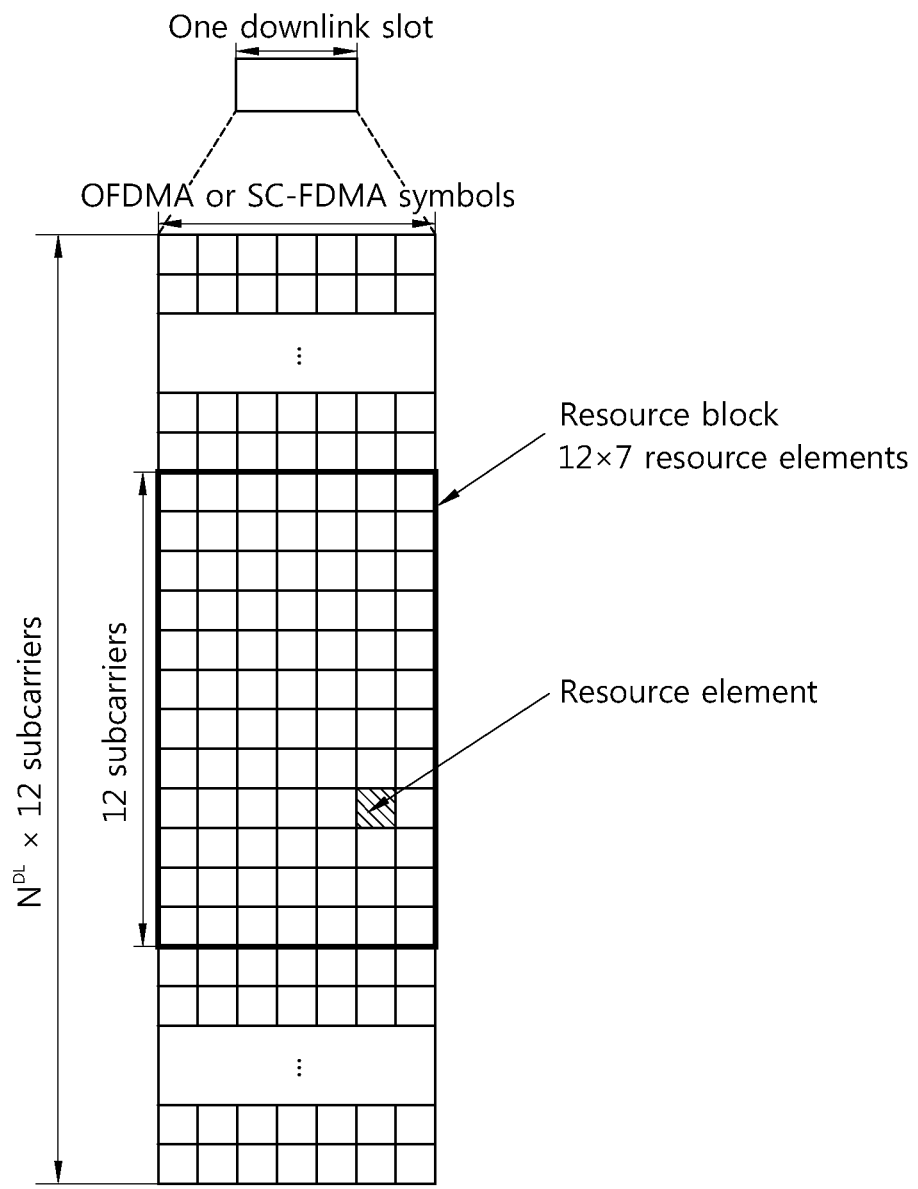
FIG. 9 illustrates a resource grid about one uplink slot.

FIG. 9 illustrates a resource grid about one uplink slot. With reference to FIG. 9, an uplink slot includes a plurality of SC-FDMA or OFDMA symbols in the time domain; and a plurality of resource blocks in the frequency domain. Here, a single uplink slot includes 7 SC-FDMA symbols and a single resource block 12 subcarriers; however, the present invention is not limited to the above example. The number of resource blocks included in an uplink slot $N^{UL}$ depends on the uplink transmission bandwidth determined in a cell.

Figure 10:
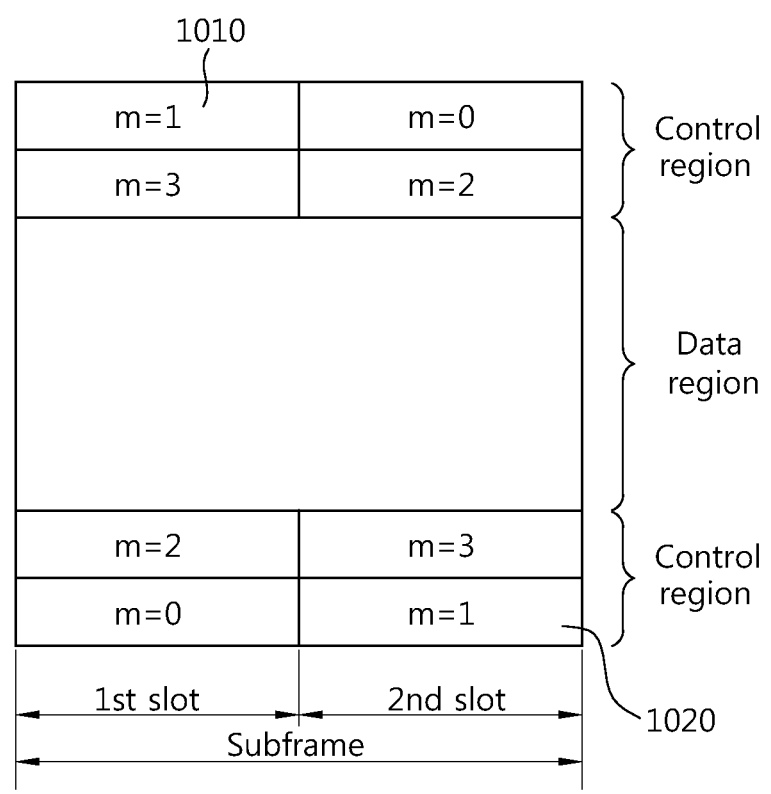
FIG. 10 illustrates a structure of an uplink subframe.

FIG. 10 illustrates a structure of an uplink subframe. With reference to FIG. 10, an uplink subframe can be divided into a control region to which PUCCH (Physical Uplink Control Channel) carrying uplink control information in the frequency domain is allocated and a data region to which PUSCH (Physical Uplink Shared Channel) carrying user data is allocated. PUCCH for UE is allocated as a pair 1010, 1020 of resource blocks in a subframe and RBs 51, 52 belonging to an RB pair occupy different subcarriers respectively in each of two slots. As such, an RB pair allocated to PUCCH is said to perform frequency hopping at a slot boundary.

In what follows, described will be operation and characteristics of an UE operating in the system above. UE can determine a position at which the UE carries out decoding for reducing the number of decoding. For example, decoding can be carried out at various periods. Periodic decoding indicates carrying out decoding at particular time intervals (Tx). Particular time intervals may be fixed or varied according to a particular pattern. Frequency resources of radio resources for which decoding is applied during a time period for decoding may be fixed for time intervals (Tx) or varied. Also, frequency resources of radio resources for which decoding is applied during a time period for decoding may be determined according to a particular pattern for each time interval (Tx).

Figure 11:
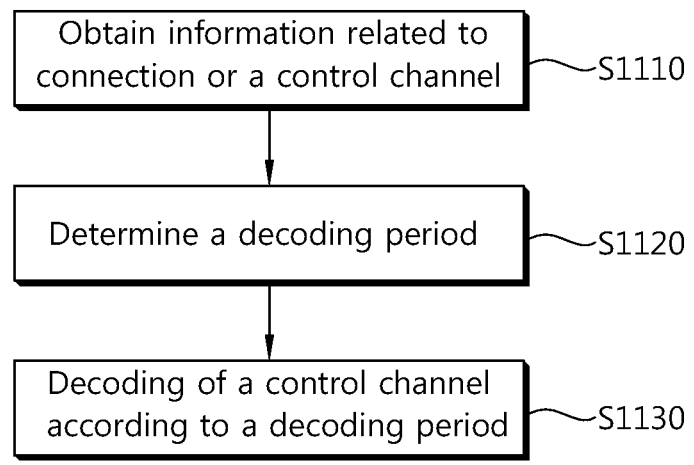
FIG. 11 illustrates one example of operation of a user equipment.

FIG. 11 illustrates one example of operation of a user equipment. UE obtains information related to connection or information related to channels from a transmission device (e.g., a base station) S1110. An example of information related to connection or channels will be described in the following. For example, UE can obtain information related to connection or channels when power is turned on or communication is commenced with a new transmission device through handover by utilizing a negotiation process. Also, UE can receive new signals while performing communication with the previous transmission device or information related to connection through data included in the previous signals. UE obtains information about decoding period determined according to information related to connection or channels S1120. UE can determine decoding period autonomously or obtain specific values of decoding periods mapped to specific values of information related to connection or channels. If UE obtains information about decoding period, decoding is carried out according to the information S1130. UE can adjust decoding period according to information related to connection or channels, thereby optimizing a communication procedure and minimizing consumption of radio resources such as battery power.

As described above, a decoding period may be determined by information related to connection or channels. Information related to connection may correspond to a logical channel related to connection to a transmission device or identifier (ID) about a physical channel. For example, information related to connection may include a service flow, a service type, or ID of a logical channel. The service flow, service type, and ID of logical channel can indicate the purpose for which a physical/logical channel related to the corresponding connection is intended. An example of a service flow may include a flow identifier (FID) capable of uniquely identifying connection within UE, parameters related to QoS (Quality of Service), and parameters related to QoE (Quality of Experience).

In what follows, described will be an example of determining a decoding period based on FID. FID is a 4 bit identifier for uniquely identifying connection within UE according to the IEEE 802.16m. FID identifies control connection and transport connection. Specific values of FID for uplink or downlink transmission may be determined as shown in Table 1 below.

TABLE 1

| Values | Descriptions |
| --- | --- |
| 0000 | Control FID (unicast control FID when PDU is allocated by unicast assignment A-MAP IE; broadcast control FID when PDU is allocated by broadcast assignment |

TABLE 1-continued

| Values | Descriptions |
|---|---|
| | A-MAP IE) |
| 0001 | FID for Signaling Header |
| 0010-1111 | Transport FID |

FID uniquely identifies connection; therefore, another downlink transport connection within the same UE is not given the same FID. Another uplink transport connection within the same UE is not given the same FID, either. However, an FID assigned to downlink transport connection may be assigned to uplink transport connection. More specific description about FID can be found at IEEE P802.16m/D4, "Part 16: Air Interface for Broadband Wireless Access Systems: Advanced Air Interface," February 2010, Section 16.2.1.2.2". The corresponding description is incorporated into this document by reference.

The number of unnecessary decoding may be reduced by setting up a position at which decoding is performed for each UE (e.g., time point where decoding is carried out) according to FID. For example, if FID is used as shown in Table 1, periods with which sought is information corresponding to the individual FIDs assigned may be determined differently from each other. In other words, decoding periods may be determined differently from each other depending on FID values. Also, even if a part of a plurality of FIDs have different FID values from each other, the same decoding period may be assigned to the corresponding FID.

The number of decoding can be increased by choosing a short period if FID is related to control signals. For example, in the case of looking for information about control FID, decoding is applied at each Tc time period to check whether information about control FID is contained. Also, information about particular control FID may be decoded only at a particular time point. In other words, search may be carried out only for a certain subframe within a frame or search may be carried out only for a particular subframe within an arbitrary frame. Since the value can be set differently for each UE, a problem due to lack of flexibility does not occur in a network.

If information about transport FID related to data signals is sought, information related to the corresponding FID can be found for each Tt time period. Similarly, information about a particular transport FID can only be found at a particular time point. In other words, a particular subframe—at least one subframe—may be searched for within a frame or searched for may be a set of particular subframes for an arbitrary frame interval.

UE can reflect a position or a period at which information search is carried out. In other words, taking account of an operating pattern of a particular FID, latency required for FID may be applied to setting up each period. For example, to set up latency for a control FID to be shorter than that for a transport FID, Tc may be determined such that Tc<Tt. Also, if FID for an emergency service is assigned, every possible decoding may be carried out by choosing the corresponding period to be shortest.

Decoding periods according to FIDs may follow classification defined in the specification with which the corresponding UE is compliant or they can be defined by subdividing the classification. For example, decoding periods may be determined by three cases according to the specification (e.g., IEEE 802.16m) as shown in Table 1; also, decoding period may be subdivided from the classification of Table 1 and different decoding periods may be set up for the respective transport FIDs.

If decoding periods are assigned according to FIDs of the above example, information about decoding period can be transmitted to UE in various ways. There is no limit for UE to obtain information about a decoding period. For example, a decoding period according to FID may be broadcast, multicast, or unicast. Also, decoding periods may be pre-defined without signaling; a pre-defined table value may be signaled; decoding period itself may be signaled; or information about a decoding period may be derived from other parameters without signaling.

As described in detail above, a decoding period may be determined by information related to connection or channel. The information related to a channel may be an identifier (ID) of a logical or a physical channel. In other words, by setting up a timing point at which each UE performs decoding differently from each other by taking account of the type of a physical and/or logical channel, the number of unnecessary decoding may be reduced. In this case, a timing point for decoding may be determined according to the type of physical channel, or logical channel, or both of physical and logical channels.

Since information related to a channel may be the information about a logical channel, in what follows, described will be a method and an apparatus for carrying out decoding according to an identifier identifying a logical channel. For example, LCID (Logical Channel ID) compliant with the LTE specification can identify at least one of MAC SDU (Media Access Control Service Data Unit), an MAC control element, and padding included in MAC PDU (MAC Protocol Data Unit). UE can determine a decoding period based on the LCID.

TABLE 2

| Index | LCID Values |
|---|---|
| 00000 | CCCH |
| 00001-01010 | Identity of the logical channel |
| 01011-11011 | Reserved |
| 11100 | UE Contention Resolution Identity |
| 11101 | Timing Advance Command |
| 11110 | DRX Command |
| 11111 | Padding |

Table 2 is one specific example of LCID values according to the LTE specification, showing one example of LCID for downlink shared channel (DL-SCH).

TABLE 3

| Index | LCID values |
|---|---|
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |

Table 3 is one specific example of LCID values according to the LTE specification, showing one example of LCID for uplink shard channel (UL-SCH).

TABLE 4

| Index | LCID values |
|---|---|
| 00000 | MCCH(see note) |
| 00001-11100 | MTCH |
| 11101 | Reserved |
| 11110 | Dynamic Scheduling Information |
| 11111 | Padding |

NOTE:
If there is no MCCH on MCH, an MTCH could use this value.

Table 4 is one specific example of LCID values according to the LTE specification, showing one example of LCID for multicast channel (MCH). A more specific example of LCID values can be found in the 3GPP TS 36.321 v9.1.0, "Evolved Universal Terrestrial Radio Access (E-UTRA) Medium Access Control (MAC) protocol specification," September 2009, Section 6.2.1. The corresponding description is incorporated into this document by reference.

A timing point at which each UE performs decoding may be set up differently from each other according to LCID, thereby reducing the number of unnecessary decoding. When LCID is employed, a period at which information corresponding to each LCID is searched for can be set up differently from each other. For example, with reference to Table 2, when information about CCCH (Common Control Channel) is looked for, decoding may be carried out at each Tc period to check whether information about the CCCH is found. Also, when information about Timing Advance Command is looked for, decoding may be carried out at each Tt period to check whether information about the Timing Advance Command is found. At this time, a period may be determined by taking account of latency required for each LCID. For example, if latency of CCCH is shorter than that of Timing Advance Command, associated periods may be set up as Tc>Tt. Also, if an emergency service is carried out, all the possible decoding may be carried out by setting up the associated period as the shortest one irrespective of LCID.

Decoding periods according to LCIDs may follow classification defined in the specification with which the corresponding UE is compliant or they can be defined by subdividing the classification. For example, decoding periods may be determined by seven cases according to the specification as shown in Table 2; also, decoding period may be subdivided from the classification of Table 2 and different decoding periods may be set up for the respective logical channels.

If decoding periods are assigned according to LCIDs of the above example, information about decoding period can be transmitted to UE in various ways. There is no limit for UE to obtain information about a decoding period. For example, a decoding period according to LCID may be broadcast, multicast, or unicast. Also, decoding periods may be pre-defined without signaling; a pre-defined table value may be signaled; decoding period itself may be signaled; or information about a decoding period may be derived from other parameters without signaling.

Since information related to a channel may be the information about a physical channel, in what follows, described will be a method and an apparatus for carrying out decoding according to a physical channel. For example, a decoding period may be determined according to the type of A-MAP compliant with the IEEE 802.16m specification.

A-MAP may be divided into i) non-user specific A-MAP not dedicated to a single user or a particular user group, ii) HARQ feedback A-MAP including ACK/NACK information related to HARQ, iii) power control A-MAP transmitting information about fast power control command, and iv) assignment A-MAP transmitting information related to resource assignment. According to the present embodiment, a decoding period may be determined according to the type of A-MAP or type of A-MAP information element (IE type). More specific description about A-MAP can be found at IEEE P802.16m/D4, "Part 16: Air Interface for Broadband Wireless Access Systems: Advanced Air Interface," February 2010, Section 16.3.6.2.2". The corresponding description is incorporated into this document by reference.

In the following, described will be assignment A-MAP among various A-MAPs described in detail above.

TABLE 5

| A-MAP IE Type | Usage | Property |
|---|---|---|
| 0b0000 | DL Basic Assignment A-MAP IE | Unicast |
| 0b0001 | UL Basic Assignment A-MAP IE | Unicast |
| 0b0010 | DL Subband Assignment A-MAP IE | Unicast |
| 0b0011 | UL Subband Assignment A-MAP IE | Unicast |
| 0b0100 | Feedback Allocation A-MAP IE | Unicast |
| 0b0101 | UL Sounding Command A-MAP IE | Unicast |
| 0b0110 | CDMA Allocation A-MAP IE | Unicast |
| 0b0111 | DL Persistent Allocation A-MAP IE | Unicast |
| 0b1000 | UL Persistent Allocation A-MAP IE | Unicast |
| 0b1001 | Group Resource Allocation A-MAP IE | Multicast |
| 0b1010 | Feedback Polling A-MAP IE | Unicast |
| 0b1011 | BR-ACK A-MAP IE | Multicast |
| 0b1100 | Broadcast Assignment A-MAP IE | Broadcast |
| 0b1101 | Reserved | NA. |
| 0b1110 | Reserved | NA. |
| 0b1111 | Extended Assignment A-MAP IE | NA. |

UE can be made to attempt detection with different periods from each other depending on the type of A-MAP (assignment A-MAP IE) as shown above. For example, persistent allocation A-MAP attempts detection with a long period. However, basic assignment A-MAP is set to attempt detection with a short period and thus, urgent communication can be supported without increasing latency through basic assignment.

Also, UE can be made to attempt detection with different period from each other depending on the property of assignment A-MAP. For example, if the property is set to broadcast, a long period is chosen while in the case of multicast, an intermediate period is chosen. If the property is set to unicast, a short period may be chosen, which indicates more frequent decoding. In this case, latency for supporting the A-MAP property can be determined efficiently.

As described above, by using different decoding periods from each other according to the property/type of assignment A-MAP, the number of carrying out a detection process by UE may be reduced and increase of latency may be prevented efficiently. Although the above example has been described by using a decoding period of UE for the purpose of convenience, it applies equally to the case of using an assignment period of a base station. In other words, UE not performing decoding according to a decoding period does not communicate with a base station.

As described above, a decoding period can be determined according to a physical/logical channel and as described later, the decoding period can also be determined according to a value used in association with a physical/logical channel. To be more specific, a decoding period may be determined through information for identifying UE.

Figure 12:
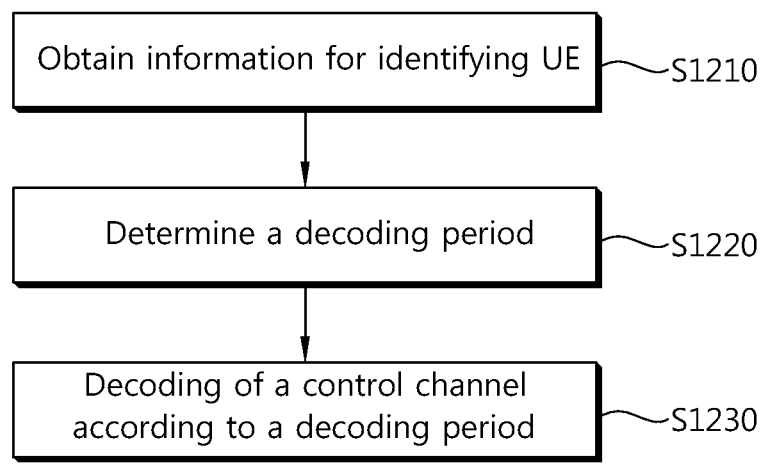
FIG. 12 illustrates one example of a method carrying out decoding according to information for identifying user equipment.

FIG. 12 illustrates one example of a method carrying out decoding according to information for identifying user equipment. UE obtains information for identifying UE S1210. For example, UE can obtain information for identifying UE while establishing communication newly with a transmission device or maintaining the existing communication. UE can obtain a decoding period by using the obtained information S1220. UE can determine a decoding period by itself and obtain a specific value of a decoding period mapped to a specific value of information related to connection or a channel. If UE obtains information about a decoding period, decoding is carried out according to the information S1230. The present method can determine a decoding period based on information for identifying UE, thereby optimizing a communication procedure and minimizing consumption of radio resources such as battery power.

The information for identifying UE above may correspond to RNTI (Radio Network Temporary Identifier) of the 3GPP LTE. In other words, according to RNTI, different decoding periods from each other can be assigned or used.

UE compliant with the LTE specification, to detect a PDCCH (Physical Downlink Control Channel), may decode the PDCCH for which CRC scrambling has been applied by a particular RNTI assigned from an upper layer. UE may be set up such that a different detection period is assigned or used for each particular RNTI.

RNTI is a unique identifier assigned to UE and its value may be determined according to a position at which the corresponding RNTI is created. RNTI includes C-RNTI (Cell RNTI), M-RNTI (MBMS RNTI), P-RNTI (Paging RNTI), RA-RNTI (Random Access RNTI), SI-RNTI (System Information RNTI), TPC-PUCCH-RNTI (Transmit Power Control-Physical Uplink Control Channel-RNTI), and TPC-PUSCH-RNTI (Transmit Power Control-Physical Uplink Shared Channel-RNTI). UE can decode a PDCCH by using different periods from each other depending on the type of RNTI. For example, SI-RNTI may be set up such that it may be used for detection with a long period while C-RNTI with a short period. In this way, by using different detection periods from each other according to the property/type of RNTI, the number of carrying out a detection process by UE may be reduced and increase of latency may be prevented efficiently. Although the above example has been described by using a detection period of UE for the purpose of convenience, it applies equally to the case of using an assignment period of a base station.

Table 6 below is a specific example of RNTI values according to the 3GPP LTE specification. Different decoding periods may be determined according to the RNTI values indicated; at the same time, different decoding periods may be determined according to specific types of RNTI even if the RNTI values are the same to each other.

TABLE 6

| Value (hexa-decimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI(see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Note:
The values corresponding to the RA-RNTI values of a cell's PRACH configuration are not used in the cell for any other RNTI (C-RNTI, Semi-Persistent Scheduling C-RNTI, Temporary C-RNTI, TPC-PUCCH-RNTI or TPC-PUSCH-RNTI).

Table 7 below provides specific illustration of RNTI according to the 3GPP LTE specification. UE can use different decoding periods according to the specific type of RNTI.

TABLE 7

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-persistently scheduled unicast transmission (activation, reactivation and retransmission) | DL-SCH, UL-SCH | DCCH, DTCH |
| Semi-Persistent Scheduling C-RNTI | Semi-persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

More specific description about RNTI can be found at 3GPP TS 36.321 v9.1.0, "Evolved Universal Terrestrial Radio Access (E-UTRA) Medium Access Control (MAC) protocol specification," September 2009, Section 7.1. The corresponding description is incorporated into this document by reference.

The method for determining a decoding period described above can be carried out in a cell-specific or UE-specific way.

The example above is related to a method for defining a channel-dependent search pattern for UE in association with a particular channel type such as FID (Flow ID) or LCID. In addition to the above, a base station can limit channels or UE's operation itself. In other words, transfer of control signals may follow a particular pattern irrespective of ID of a control channel or ID of a data channel that should be received by UE when it comes to all the operation related to reception or transmission. For example, restricting conditions are removed such that a base station transfers a control signal to UE only at a particular period or particular timing point and other than that, allows power-off state if traffic for the UE does not exist. In that case, communication capacity of UE may be reduced; therefore, it is preferable that a base station assumes such structure that even if the base station transmits control signals only at a particular subframe position(s), it also transmits control information about positions of other subframes. For example, a base station may have such structure capable of assigning resources for other subframe positions at a particular subframe position.

Different from the above, if UE performs a task of searching for a particular channel or a channel group, the UE may impose a restriction on a pattern with which it carries out a search for the channel(s) in question. Therefore, through a negotiation process (an indication procedure may be needed)

with a base station, UE can know independently which control information comes at which time point. In this way, through information about a period of each channel or transmission time point, UE carries out a task of searching for the corresponding channel. On the contrary, a transmission time point for a particular channel group may be defined by a pattern of periods or particular values. For example, energy saving operation for UE may be carried out by carrying out transmission of control information of high relevance in such a way that the corresponding subframe or a particular subframe set (which may be defined as a subframe set comprising consecutive subframes or distributed subframes) is all transmitted whereas the remaining subframes are not transmitted to the corresponding UE. As another example, all the things related to a control channel may be transmitted only within subframe(s) to which data are assigned.

In the case where content of a channel changes frequently (i.e., control information is transmitted often), a base station or UE may apply persistent scheduling for transmission of a channel. In other words, in transmitting a particular control channel(s), a particular allocation position may be fixed and UE may receive or transmit data of the particular control channel at the corresponding position. In this case, UE does not receive the allocation information each time but receives it at a predetermined period or searches for the allocation information at a particular subframe time point. Unless channel information is generated so heavily, UE doesn't necessarily have to carry out decoding or transmission. For example, if the control information is updated at a particular time point, UE may share the information about the corresponding time point and transmit or receive to and from a base station the control information only according to the corresponding period. On the contrary, it may be the case that an independent control channel receiving change information of channels is set up separately and if a change is displayed (a form of bitmap is allowed), UE carries out a task of detecting the corresponding channels.

Characteristics applied to a logical channel from among those described in the above example may also be applied to a physical channel. For example, information about physical control channels—in the case of the IEEE P802.16m, sounding channel, bandwidth request channel, ranging channel, etc.—can be decoded at different periods from each other. Also, decoding may be carried out according to decoding periods determined based on MAC messages—in the case of IEEE P802.16m, AAI_RNG-REQ, AAI_RNG-ACK, and so on.

The decoding period may be defined by various units. For example, it may be defined by subframe, frame, or units of subframe. In this case, signaling may be carried out according to the corresponding unit.

Figure 13:
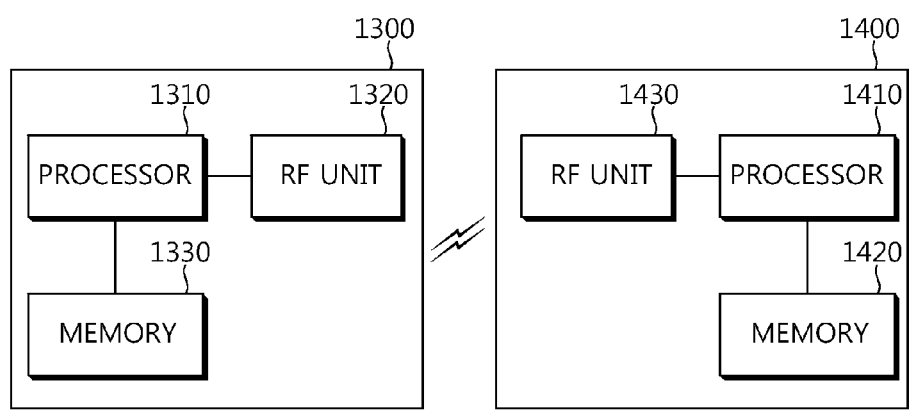
FIG. 13 illustrates user equipment and a base station according to an embodiment described in detail.

FIG. 13 illustrates user equipment and a base station according to an embodiment described in detail. UE 1300 comprises a processor 1310, memory 1330, and an RF (Radio Frequency) unit 1320. A processor 1310 can assign radio resources according to information provided from the outside, information pre-stored inside, and so on. From among embodiments described above, a procedure, method, and function carried out by UE may be implemented by the processor 1310. The memory 1330, being connected to the processor 1310, stores various kinds of information for activating the processor 1310. The RF unit 1320, being connected to the processor 1310, transmits and/or receives radio signals.

A base station 1400 communicating with the UE comprises a processor 1410, memory 1420, and an RF (Radio Frequency) unit 1430. From among embodiments described above, a procedure, method, and function carried out by a base station may be implemented by the processor 1410. The memory 1420, being connected to the processor 1410, stores various kinds of information for activating the processor 1410. The RF unit 1430, being connected to the processor 1410, transmits and/or receives radio signals.

The processor 1310, 1410 may include ASIC (Application-Specific Integrated Circuit), other chipsets, logic circuit and/or data processing apparatus. The memory 1310, 1420 may include ROM (Read-Only Memory), RAM (Random Access Memory), flash memory, memory card, storage medium and/or other storage devices. The RF unit 1330, 1430 may include a baseband circuit for processing radio signals. If the embodiments are implemented by software, the met hods d escribed above may be implemented by a module (procedure, function, etc.) carrying out the function above. The module may be stored in the memory 1320, 1420 and carried out by the processor 1310, 1410. The memory 1320, 1420 may be installed inside or outside of the processor 1310, 1410 and connected to the processor 1310, 1410 through various, well-known methods.

The present description may be implemented based on hardware, software, or their combination. When implemented in hardware, the above-explained features are implemented by ASIC (Application-Specific Integrated Circuit), other chipsets, logic circuit and/or data processing apparatus. When implemented in software, such feature may be implemented by a module. The module may be stored in the memory and carried out by the processor.

Preferred embodiments of the present invention have been described in detail. It should be noted that the present invention may be embodied with various modifications or changes thereof by those skilled in the art to which the present invention belongs without departing the fundamental concepts of the present invention defined in the appended claims. Therefore, modifications of embodiments of the present invention afterwards will not be able to depart the technical scope of the present invention.

The invention claimed is:

1. A method for processing signals received from a base station in a wireless communication system, the method performed by a mobile terminal and comprising:

obtaining, by the mobile terminal, information on a plurality of identifiers for identifying the mobile terminal;

obtaining, by the mobile terminal, information related to a connection to the base station or information related to a channel to the base station;

self-determining, by the mobile terminal, decoding periods about how often each of a control channel and a data channel has to be decoded, wherein the decoding periods are determined in consideration of both the obtained connection or channel information and the obtained identifiers; and decoding, by the mobile terminal, the control channel and the data channel according to the decoding periods including multiple subframes, regardless of what periods the control channel and the data channel are transmitted from the base station, wherein a decoding period for the control channel is determined to be different from a decoding period for the data channel, wherein the information on the identifiers for identifying the mobile terminal is at least two or more of Cell Radio Network Temporary Identifier (C-RNTI), Multimedia Broadcast and Multicast services-RNTI (MBMS RNTI), Paging RNTI (P-RNTI), Random Access RNTI (RA-RNTI), System Information RNTI (SI-RNTI), Transmit Power Control-Physical Uplink Control Channel-RNTI (TPC-PUCCH-RNTI), and Transmit Power Control-Physical Uplink Shared Channel-RNTI (TPC-PUSCH-RNTI), and
wherein the first control channel and the second control channel correspond to a Physical Downlink Control Channel (PDCCH) and each Cyclic Redundancy Check (CRC) of the first and second control channel is masked by each identifier.

2. The method of claim 1, wherein the information related to the connection includes an identifier identifying at least one of a logical and a physical channel related to the connection.

3. The method of claim 1, wherein the information related to the connection is a flow identifier (FID) for identifying the connection and the FID identifies a connection in a Media Access Control (MAC) layer and the step of decoding includes decoding information related to the FID.

4. The method of claim 1, wherein the information related to the channel is a logical channel identifier (LCID) for identifying at least one of MAC SDU (Media Access Control Service Data Unit), MAC control element, and padding which is included in MAC PDU (MAC Protocol Data Unit), or
wherein the information related to the channel is information related to a physical channel, wherein the decoding period is determined by whether at least one of non-user specific A-MAP, HARQ feedback A-MAP, power control A-MAP, and assignment A-MAP is corresponding to A-MAP related to the physical channel.

5. The method of claim 1, wherein the information related to the channel is information related to a physical channel, wherein the decoding period is determined by information element included in A-MAP related to the physical channel.

6. A mobile terminal for processing signals received from a base station device in a wireless communication system, the mobile terminal comprising:
a processor configured to:
obtain information on a plurality of identifiers for identifying the mobile terminal,
obtain information related to a connection to the base station or information related to a channel to the base station,
self-determine decoding periods about how often each of a control channel and a data channel has to be decoded, wherein the decoding periods are determined in consideration of both the obtained connection or channel information and the obtained identifiers, and
decode the control channel and the data channel according to the decoding periods including multiple subframes, regardless of what periods the control channel and the data channel are transmitted from the base station,
wherein a decoding period for the control channel is determined to be different from a decoding period for the data channel,
wherein the information on the identifiers for identifying the mobile terminal is at least two or more of Cell Radio Network Temporary Identifier (C-RNTI), Multimedia Broadcast and Multicast services-RNTI (MBMS RNTI), Paging RNTI (P-RNTI), Random Access RNTI (RA-RNTI), System Information RNTI (SI-RNTI), Transmit Power Control-Physical Uplink Control Channel-RNTI (TPC-PUCCH-RNTI), and Transmit Power Control-Physical Uplink Shared Channel-RNTI (TPC-PUSCH-RNTI), and wherein the first control channel and the second control channel correspond to a Physical Downlink Control Channel (PDCCH) and each Cyclic Redundancy Check (CRC) of the first and second control channel is masked by each identifier.

* * * * *